US009340883B2

(12) United States Patent
Iltsenko et al.

(10) Patent No.: US 9,340,883 B2
(45) Date of Patent: May 17, 2016

(54) METHOD AND ELECTROLYSER FOR DISINFECTANT PRODUCTION

(71) Applicants: Valeri Iltsenko, Tallinn (EE); Nikolay Nayda, Tallinn (EE)

(72) Inventors: Valeri Iltsenko, Tallinn (EE); Nikolay Nayda, Tallinn (EE)

(*) Notice: Subject to any disclaimer, the term of this patent is extended or adjusted under 35 U.S.C. 154(b) by 0 days.

(21) Appl. No.: 14/036,987

(22) Filed: Sep. 25, 2013

(65) Prior Publication Data

US 2014/0021061 A1 Jan. 23, 2014

Related U.S. Application Data

(62) Division of application No. 13/008,742, filed on Jan. 18, 2011, now Pat. No. 8,568,574.

(30) Foreign Application Priority Data

Sep. 9, 2010 (EE) .................................. 201000069

(51) Int. Cl.
  C25B 1/26 (2006.01)
  C02F 1/461 (2006.01)
  (Continued)

(52) U.S. Cl.
  CPC . *C25B 1/26* (2013.01); *C02F 1/467* (2013.01); *C02F 1/46109* (2013.01); *C02F 2201/003* (2013.01); *C02F 2201/46145* (2013.01); *C02F 2201/46155* (2013.01); *C02F 2209/06* (2013.01)

(58) Field of Classification Search
  CPC .............. C02F 2201/003; C02F 1/467; C02F 2201/46155; C25B 1/26
  USPC ................... 204/260, 272; 205/556, 620, 637
  See application file for complete search history.

(56) References Cited

U.S. PATENT DOCUMENTS

| 5,529,672 A | 6/1996 | Barr et al. |
| 2004/0060815 A1 | 4/2004 | Buckley et al. |

(Continued)

FOREIGN PATENT DOCUMENTS

| EE | 200700021 A | 12/2008 |
| RU | 2079575 C1 | 5/1997 |
| RU | 2088539 | 8/1997 |

(Continued)

OTHER PUBLICATIONS

English Abstract for RU2079575.

(Continued)

*Primary Examiner* — Steven A. Friday
(74) *Attorney, Agent, or Firm* — Fishman Stewart PLLC

(57) ABSTRACT

Exemplary electrolytic methods are disclosed relating to preparation of useful products, e.g., disinfectants, from aqueous solutions of electrolytes. Disinfectant production with a capacity of a single electrolyzer may amount to 1200 liters per hour and up to 600 grams of active chlorine per hour by utilizing 3-7 gram sodium chloride (NaCl) for the production of 1 gram of active chlorine on the basis of a reliable and safe hydraulic structure. A fresh water supply may initially be directed into an internal tubular cathode chamber for cathode cooling purposes, before the participation in final disinfectant production process. A coolable cathode may increase the hold-up time of the electrolyte in the electrode chamber without application of circulation circuits, improving significantly the efficiency of sodium chloride utilization. The simplicity of the method makes it possible to increase both the productivity of a single electrolyzer and the efficiency of the process.

3 Claims, 3 Drawing Sheets

(51) Int. Cl.
*C02F 1/467* (2006.01)
*C25B 1/46* (2006.01)

(56) References Cited

U.S. PATENT DOCUMENTS

2008/0264781 A1 10/2008 Iltsenko et al.
2009/0266709 A1 10/2009 Iltsenko et al.

FOREIGN PATENT DOCUMENTS

| RU | 2088539 C1 | 8/1997 |
|---|---|---|
| RU | 2088693 C1 | 8/1997 |
| RU | 2148027 C1 | 4/2000 |
| RU | 2208589 C2 | 7/2003 |
| RU | 2297980 C1 | 4/2007 |
| RU | 2322397 C1 | 4/2008 |
| RU | 2350692 C1 | 3/2009 |
| WO | WO-02085795 A1 | 10/2002 |
| WO | WO-2004031077 A2 | 4/2004 |
| WO | WO-2006098660 A1 | 9/2006 |

OTHER PUBLICATIONS

English Abstract for RU 2088539.

METHOD AND ELECTROLYSER FOR DISINFECTANT PRODUCTION

CROSS REFERENCE TO RELATED APPLICATIONS

This application is a divisional application of U.S. Ser. No. 13/008,742 filed on Jan. 18, 2011, which claims priority to Estonian Patent Application No. P201000069, filed on Sep. 9, 2009, which applications are incorporated herein by reference in their entirety.

TECHNICAL FIELD

The disclosure relates generally to the field of chemical engineering and is used for acquiring production, by using the method of electrolysis, on an aqueous solution of electrolyte of various concentrations, which can be applied to produce disinfectants such as that used in the field of health care, biology and ecology. More specifically, the disclosure deals with electro-chemical technology for producing fresh-water based disinfecting solutions by using diaphragm-electrolysers.

PRIOR ART

A number of methods are known for producing disinfecting solutions from anodic produce of an aqueous solution of sodium chloride (NaCl), combined with using cathodic produce of electrolysis for increasing the pH of disinfecting solution or without.

Patents/Applications RU2079575, RU2297980, WO2004/031077 and US2004/0060815 describe methods, whereby electrolyte with equivalent concentration—approximately 10 g/l—is simultaneously channelled into anode and cathode chambers. The anolyte, obtained as the electrolyser's output, is a ready to use as disinfecting solution, whereas the pH of the anolyte can be adjusted to a certain extent by changing the ratio of anolyte and catholyte quantities.

According to the inventor, however, these methods are insufficient as the consequence of low efficiency of salt for obtaining disinfectant, as in the case of a number of technologies, high mineralisation of disinfectant will be accompanied by critical accumulation of chlorides in agricultural soil, water circulation pipes of cooling systems, etc. In the case of some other technologies, wherein large quantities of disinfecting solutions are used (200 cubic meters, in average), for example, municipal water and waste water treatment facilities, high demand for sodium chloride (more than 2 tons per day) will decrease the interest in implementing these methods. Decreasing the mineralization of disinfecting substance by increasing the number of electrolysers proportionally will increase the cost of the method and complicate the exploitation of equipment. Total consumption of sodium chloride per 1 gram of active chlorine will be above 12 grams in these methods.

Another material disadvantage of known methods is the need for rational use of catholyte, requiring 5-50% water and salt, and which is often discharged—without any effect—into waste water disposal systems.

A method, described in patents RU2088539 and RU2208589 is also known, involving discharging electrolyte with sodium chloride concentration of approximately 10 g/l, in succession, first into a cathode chamber and then from the cathode chamber to the anode chamber. In the electrolyser's output, the anolyte will be a ready-made disinfectant with the approximate pH level of 9.0. The pH level of the anolyte can be diminished, if applicable, by discharging some of the catholyte for utilisation before being channelled to the anode chamber. The disadvantage of the method described is low efficiency of using sodium chloride—more than 8 grams per 1 gram of active chlorine.

Another method is described in patents RU2148027 and WO02/085795, involving channelling electrolyte with the approximate concentration of 2.5 g/l into the anode chamber, while concentrated electrolyte with the concentration of 100-300 g/l will enter the cathode chamber from a circulation circuit. The anolyte in electrolyser's output is a ready-made disinfectant. Approximately 7 grams of sodium chloride will be used per 1 gram of active chlorine. The disadvantage of the method, however, is to use circulation of the cathode side for cooling and transfer of electrolyte, which shall further increase the number of narrow passages, which will be covered by cathode sediments.

Methods for acquiring disinfecting solution, described in patent application WO2006/098660 are also known, involving channelling electrolyte at the concentration of up to 2 g/l and 1 g/l, respectively, for single and multiple flow, into the anode chamber, in quantities equal to disinfectant acquired, not considering the amount of catholyte, required to adjust pH level. Electrolyte from the circulation circuit, which will be mostly filled from electrolyte, out-flowing from the anode chamber, will be discharged into the cathode chamber; the electrolyte will be infiltrated into the circulation circuit through the diaphragm, as the result of difference in pressure, generated in the anode and cathode chambers. Anolyte, obtained from the output of the electrolyser of the latter, is a product ready for use. The efficiency of the method is approximately 5.0 grams of sodium chloride per 1 gram of active chlorine, but the implementation of the method is aggravated by the need to employ a pressure regulation device and a circulation circuit in the anode channel.

A method for acquiring aqueous solutions of anode oxidation of chloride solution is also described in patent RU2088693; the method is used for water cleaning and disinfecting processes, involving channelling electrolyte—concentrated (up to 300 g/l) sodium chloride solution—into the anode chamber from the circulation circuit, and fresh water based electrolyte into the cathode chamber from the circuit on the cathode's side. Gaseous anode product, mostly consisting of chlorine, will be discharged from electrolyser, where it can be mixed with a part of the catholyte and dissolved to the required concentration in fresh water. The method is characterised by high efficiency (salt requirement approximately 3 g per gram), but the disadvantages should be also pointed out—complicated circulation circuits and pressure regulating devices, but also enhanced requirements to sealing of joints and chemical resistance of materials, being in contact with the gaseous chlorine.

Patent RU2322397 describes a method for acquiring aqueous solutions of oxidants, where, as it was the case of the method described earlier, concentrated electrolyte will be processed in the anode chamber. Mostly gaseous chlorine is produced, as the consequence, and fresh water is charged into the cathode chamber, which will be discharged, once treated in the cathode chamber, from the electrolyser to be mixed with gaseous chlorine. The presence of highly concentrated gaseous chlorine will restrict the number of possible spheres for safe use of the equipment.

As this disclosure expects the widest implementation of disinfectants developed to take place at the sites where the disinfectants are used most widely (institutions of treatment and preventive care, establishments producing meat, milk, feedingstuffs and other products, farms, swimming pools, water treatment facilities, etc.), the method for obtaining disinfectants, published in patent application WO2006/098660 (example 2, FIG. 2), has been chosen for obtaining disinfectants.

In the method described in the prototype, aqueous solution of sodium chloride with the concentration of 0.2-2.0 g/l is flowing through the anode chamber, having the active chlorine concentration of a working solution in the anode chamber and the electrolyser output. Electrolyte, infiltrated into the cathode chamber from the anode chamber, through the diaphragm, flows through the cathode chamber. Important common characteristics of the prototype and the method, given in the patent application, is slow renewal of electrolyte in the cathode chamber and using fresh water as the starting electrolyte in the cathode chamber.

The main disadvantage of the prototype method is the need to maintain a pressure high enough in the anode chamber to ensure sufficient flow of electrolytes into the cathode chamber, above all, considering the fact that cathode sediments are created at the anode side of the diaphragm. Another disadvantage of the method is the need to increase the pH of acid solution, discharged from the anode chamber, to a neutral value of 5.5-7.5, because of the high pressure of anolyte, using catholyte to meet this objective. Catholyte is dispensed, using the separator type auxiliary equipment.

Technical restrictions to the construction of electrolysers used and low productivity can be highlighted as the main disadvantage of the methods described; this requires the use of auxiliary equipment for increasing the efficiency and ensuring the circulation of concentrated electrolyte, for cooling electrolyte and bringing the pH value of used disinfectants to the required neutral value of 5.5-7.5.

The patent RU2350692 provides a detailed description of diaphragm electrolysers with cylindrical flow; this type is used for the implementation of a majority of the methods, described above. The largest is capable of producing 25 grams of active chlorine per hour, therefore, the use of the aforementioned electrolysers for mass production purposes is complicated, as more than 150 grams of active chlorine per hour is required there.

A two-chamber coaxial electrolyser with the productivity of up to 150 grams of active chlorine is known from the patent application EE200700021, the main elements of the device being a tubular cathode, a diaphragm and an anode. The cathode is in an internal position, and between the cathode and the anode, the whole external electrode is an anode, which is coated from the outside with hydro and electrical insulation of a red color. The anode, cathode and diaphragm are fitted, coaxially, with the upper and lower covers, which shall give the flow of electrolyte a spiral direction; branches of the anode chamber are made into the covers, having the dimensions, which will prevent the anode from being in an area, characterised by enhanced corroding properties, on the boundary of a liquid and gaseous stage. The disadvantage of this electrolyser is insufficient productivity—up to 150 grams of active chlorine per hour and the need to use external circulation, cooling and mixing equipment in efficient processes.

A cylindrical, membrane electrolyser (such as that described in pending patent application US2009266709) with an assembled anode and an assembled diaphragm is chosen as the prototype, having the following main elements: a tubular cathode (internal electrode), diaphragm, anode (external electrode), coated from the outside with a hydro and an electrical insulation of red color, whereas both the diaphragm and the anode are assembled coaxially towards the longitudinal axis, using sleeves with channels for the movement of electrolyte from one end of the anode to the other. Coaxial construction of the electrodes and the diaphragm is ensured with lower and upper covers, characterised by the direction of the input and output channels, which give the movement of electrolytes along the electrodes a spiral nature. The upper cover has an additional opening for exhausting cathode gases. The electrolyser is capable of producing up to 600 grams of active chlorine per hour under a long-term regime. However, the need to employ external circulation, cooling and mixing devices in efficient processes can be described as the main disadvantage of this electrolyser.

BRIEF SUMMARY

The function of the disclosure is to produce disinfectants, using an electrolyser and diaphragm electrolyse anodising products of a sodium chloride solution with the pH value of 5.5-7.5, using 3-7 grams of salt per 1 gram of active chlorine, electrolysers with the productivity of up to 600 grams of active chlorine per device, a simplified hydraulic scheme—as compared to processes of comparable efficiency and involving the use of salt—and enhancing the reliability and safety of the equipment.

The above task will be accomplished by employing a method for obtaining disinfectants, matching the patent application, involving the electrolysis of sodium chloride solution into the anode chamber of electrolyser, whereby the following characteristic parameters must be ensured: fresh water based electrolyte will be channelled into the cathode chamber, the quantity being equal to 0.4-0.8% of the quantity of disinfectant obtained, thus providing for high conductivity of the cathode chamber without an extra sodium chloride requirement. The catholyte will be eliminated from circulation immediately after being discharged from the electrolyser. Intensive conversion of sodium chloride into active chlorine will be achieved not by creating high pressure in the anode chamber, but increasing the hold-up time of electrolyte in the anode chamber by cutting the flow through the chamber by 16-20% of the quantity of disinfectant acquired. The anolyte will acquire the concentration of active chlorine in the anode chamber, which is safe for the materials used, and before being discharged from the electrolyser, the concentration will be taken to a limit, which is recommended for safe use of the disinfectant by the maintenance staff. High-productivity electrolyser is used, ensuring the cooling of small quantities of electrolyte, and bringing the concentration of anolyte to the level required of disinfectants.

The description of the suggested method is as follows: disinfectant is obtained from a sodium chloride solution with the concentration up to 12 g/l, which flows through the anode chamber at the rate of 16-20% of the disinfectant obtained; at the same time a solution, containing 0.2-12 grams of sodium chloride per liter and 0.4-0.8% of the quantity of disinfectant, will be flowing through the cathode chamber; at the same time, fresh water from a water supply network will be flowing through a tubular cathode, directed towards the electrolyser's cover-mixer input. Anolyte, produced in the anode chamber, has active chlorine concentration up to 3 grams. It will be raised to the branch in the anode chamber in the cover-mixer of electrolyser from the space adjacent to anode, where it is mixed with inflowing water and leaves the electrolyser as a ready-to-use disinfectant with 5.5-7.5 pH level. Catholyte will be discharged into a utilisation device while hydrogen is discharged into exhaust channels.

The diaphragm electrolyser has the following parts: an anode with a coaxial location, a diaphragm and a cathode (anode—external electrode; tubular cathode—internal electrode), and monolith covers with inputs for electrolyte and outputs for electrolytic products. The upper cover has two outputs from the cathode chamber—one for catholyte and the other, higher up, for cathode gases. The electrolyser used is characterized by the fact that the tubular cathode has hermetic caps at both ends. The bottom cover of the cathode has a fresh water intake opening, while the upper cover has an output opening. Electrical terminals of the cathode are welded to the cylindrical surface in the area between the bottom cover of the cathode and the bottom cover of electrolyser, while the upper cover of electrolyser has an opening for entering to the branch of the anode chamber at the same side with the disinfectant output opening.

The characterizing parameters of the proposed electrolyser are the following: an internal tubular cooling cathode with covers and an opening for the inlet and outlet of fresh water, an upper cover-mixer with an opening to let fresh water into the branch of the anode chamber. The productivity of electrolyser is 40-1200 liters of disinfectant at the concentration of up to 500 mg active chlorine per 1 liter during the whole production interval.

As the consequence of a joint implementation of the proposed method and characteristic features of the electrolyser, the disinfectant is obtained, under the method set out in the claims, by effective use of salt—3.0-7.0 grams of sodium chloride to produce 1 gram of active chlorine—as the same quantity of sodium chloride in electrolyte will require 5-6 times as much time to pass through the same anode chamber, being conserved as active chlorine more fully. The process is completely safe for both the staff and environment, as the electrolyser is not operating under pressure, while the product of electrolysis is an anolyte, which is obtained as the result of electro-chemical reactions, described with well-known formulas (Elektrochemische Kinetik, Dr Klaus J. Vetter, Springer-Verlag, 1961, §7), and the fluid has active chlorine content up to 3.0 g/l, which is safe for seals, materials and the electrolysers as a whole, and involves active chlorine compounds, the main component being hypochlorous acid (HClO). Before leaving the electrolyser, the concentration of anolyte will be brought to the level characteristic of the concentration of disinfectant, which will be safe for the handling staff. A cooling cathode allows for excluding a catholyte circuit from the process. Exclusion of a circulation circuit shall enhance the reliability of the hydraulic scheme and allows for leaving out equipment used to create overpressure in the anode channel. Equal pressure in the electrode chambers will facilitate the emergence of a neutral pH level of anolyte and allows for excluding a mixing place for anolyte and catholyte from the process. The implementation of electrolysers developed shall give a chance to use the proposed method for achieving high productivity and lowering maintenance costs, as the use of salt becomes more efficient, the construction of the system is simplified, while the reliability of the system is enhanced and the number of electrolysers, operating simultaneously at the consumer, will be relatively smaller. Decreased mineralization of disinfectant will expand the application of the agent.

The disclosure will contribute to considerable simplification of the process for obtaining disinfectants and lowering the related costs, expanding the production range while simplifying the maintenance of production systems and expanding the possible areas of application of the ecological disinfectant thus obtained.

DETAILED DESCRIPTION

Figure 1:
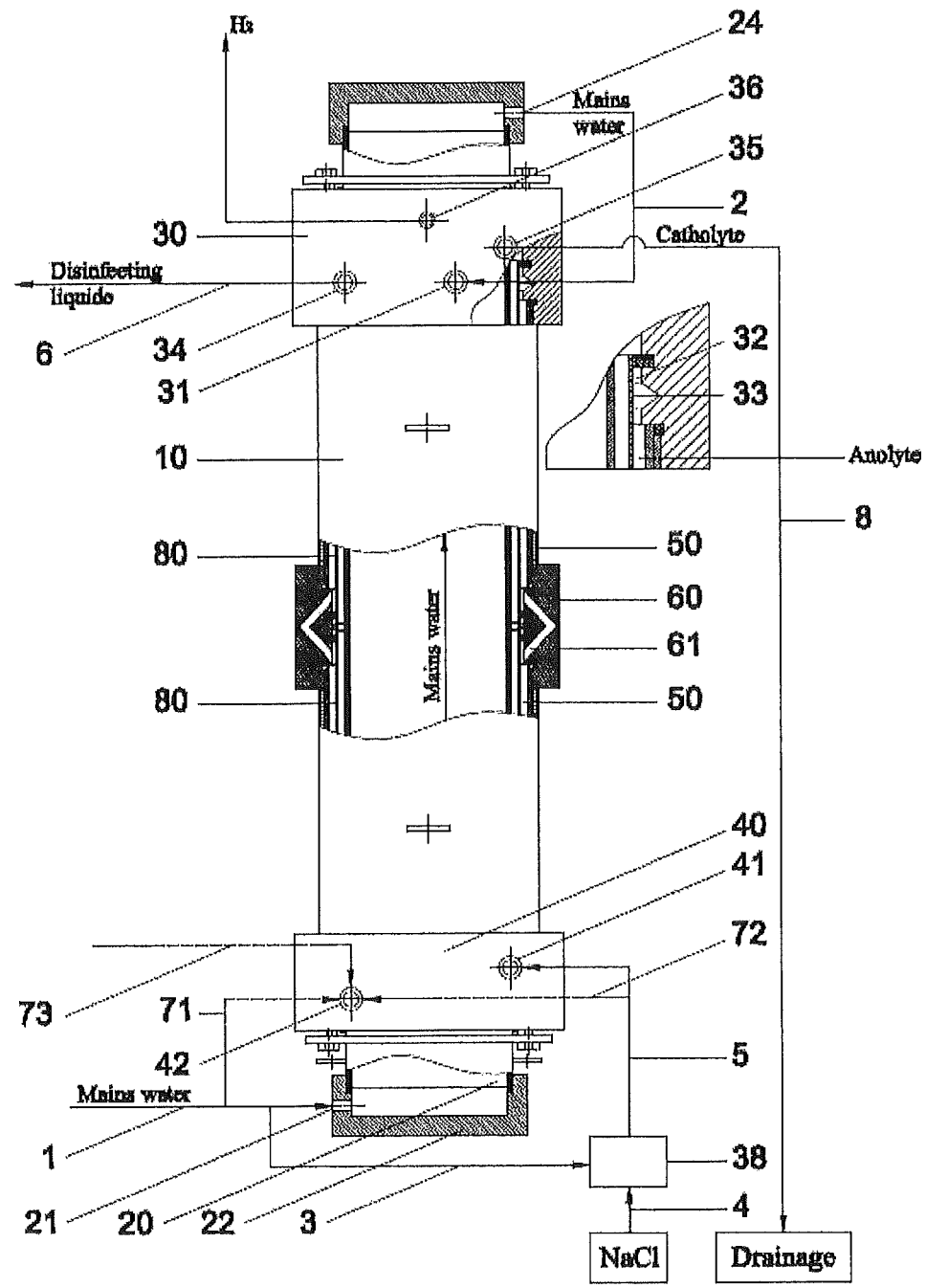
FIG. 1 depicts a hydraulic scheme of an exemplary method and an electrolyser for implementing the method.

FIG. 1 shows that the hydraulic scheme of the exemplary methods involves a number of flows. A fresh water flow 1 enters an inlet 21 at a bottom cover 22 of a cathode 20 and is then transferred though an internal space of cathode 20, up to an upper cover 23 of the cathode 20, and through an outlet 24 as a flow 2, to an inlet 31 of a cover-mixer 30. A flow 3 will be separated from flow 1 (or flow 2—not shown here) and enters a sodium chloride mixer 38, where a flow 4 is channelled as a sodium chloride concentrate, which is then mixed and transferred, as the flow of anode chamber electrolytes 5, into an inlet 41 at a bottom cover of an electrolyser 40. The electrolyte will flow along a surface of an anode 50, through channels 61 in the body of a coupling sleeve 60, flowing as anolyte into the branch of anode chamber 32 in the electrolyser's cover-mixer 30, mixing with flow 2, which is flowing towards the channel 33 along the branch's perimeter, and shall exit as a flow 6 from an outlet 34 as a disinfectant at the consumer. Options are available for filling the cathode chamber through inlet 42 at the bottom cover 40 of the electrolyser; the suitable alternative is chosen, depending on technical feasibility. When choosing the electrolyte for the cathode chamber: if fresh water is used as electrolyte, then the branching should take place at 71 from flow 1 (or flow 2—not shown here). If an anode chamber electrolyte is used as the cathode chamber electrolyte, the branching should take place at 72 from flow 5. Electrolytes with special composition and purpose are transferred as an independent flow 73. The flow of catholyte 8 will be discharged for utilization purposes from an outlet 35 of the mixer-cover 30. Hydrogen will be emitted from an outlet 36 into an exhaust system.

Figure 2:
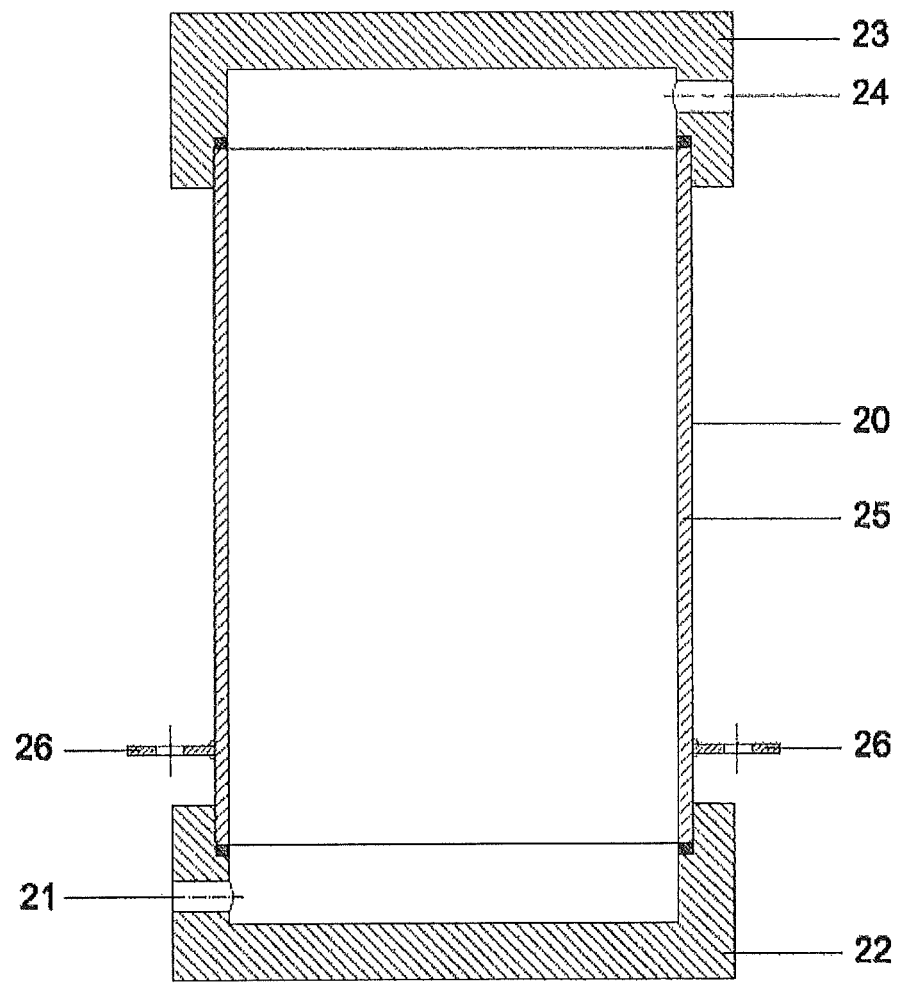
FIG. 2 depicts a cooling cathode.

FIG. 2 depicts a cathode 20, distinguished by being made as an open tube 25. Tube 25 is fitted with hermetically sealed covers 22 and 23 with openings 21 and 24, serving as water inlets and outlets. Tube 25 is also fitted with electrical terminals 26, which are fitted to ensure the assembly of electrolyser 10 (see FIG. 1) to the area remaining between the bottom cover 40 of the cylindrical outer surface of the cathode 20 and the bottom cover of the cathode 22.

Figure 3:
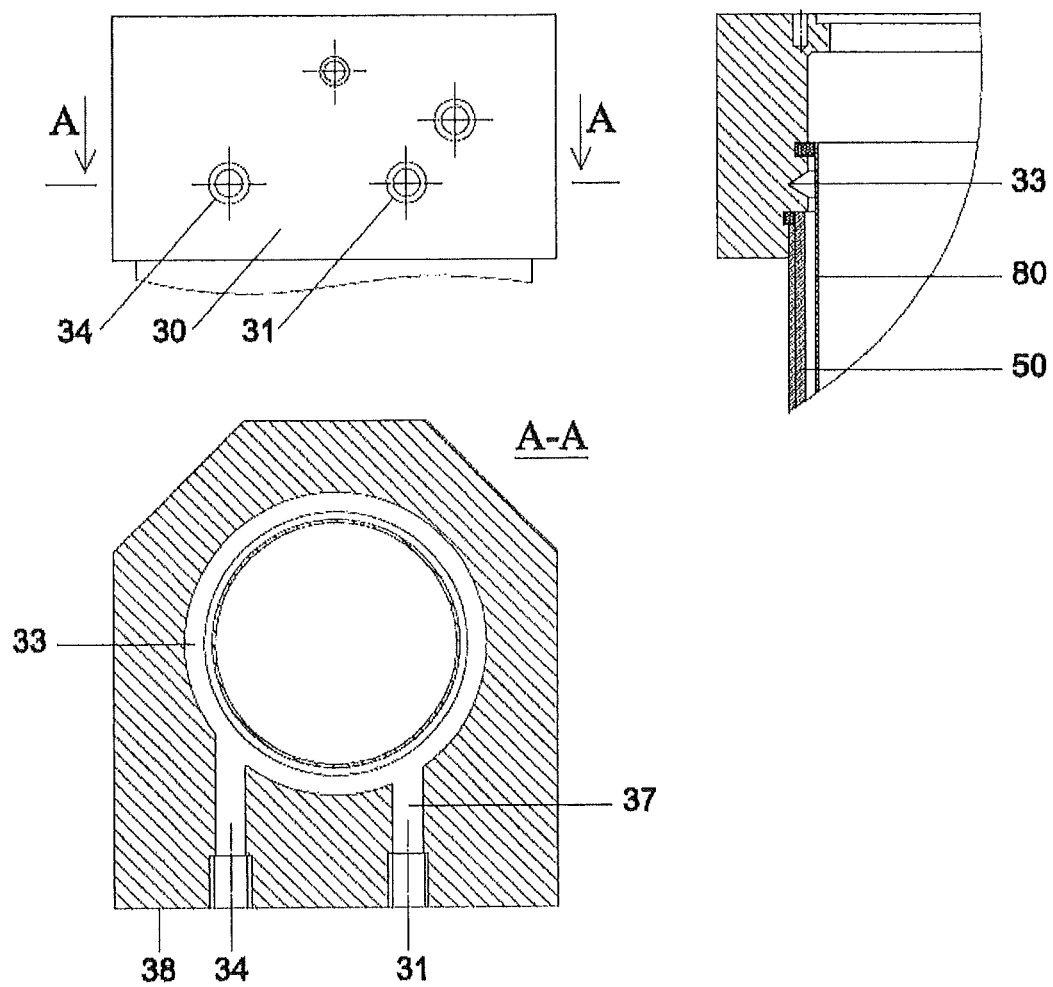
FIG. 3 depicts a cover-mixer.

FIG. 3 depicts the cover-mixer 30, which has been shown, for the demonstration purposes, assembled in part, with an anode 50 and a diaphragm 80. The cover-mixer 30 is fitted with a fresh water inlet 31, which is fitted with an outlet 34 at one facet of cover 38. The direction of the channel 37 of inlet 31 matches the spiral movement direction of electrolyte inside the anode chamber. A guiding groove 33 is devised to run along the full perimeter of the cylindrical branch of the anode chamber to facilitate mixing of water and anolyte. The longitudinal axis of groove 33 and centers of openings 31 and 34 are at the same height.

The following examples are being used to illustrate alternatives for implementing the proposed method.

Example 1

Example 1 gives the results of the method employed in Russian patent RU2297980, which have been achieved with an electrolyser disclosed in pending patent application US2009266709, having the geometrical parameters of the electrode chambers and the diaphragm, anode, cathode and anode covering materials, which are identical to the electrolyser, developed within the framework of this intention, used in examples 2, 3, 4 and 5. The results of example 1, obtained with the method employed in Russian patent RU2297980, are used to compare the results of other examples, as the utilized method is widely used, safe, and reproducible, as ready to use disinfectant and the catholyte is flowing out from the electrolyser. Electrodes are inserted into anode and cathode chamber without any prior electro-chemical treatment and the method shall be operable without any assistance from various auxiliary equipment, for example, circulation circuits, additional electrolysers and pressure regulating devices in electrode chambers. The results of all the examples are summarised in Table 1.

In example 1, used as comparison, the total flow of water used will be mixed with sodium chloride to achieve the concentration of 12 g/l and will be then separated into two flows: one flow (520 liters per hour) will enter the cathode chamber while the other flow (620 liters per hour) will enter the anode chamber. The ratio of catholyte and anolyte quantities will meet the interval, given by the method employed in Russian patent RU2297980—76.5%. Disinfectant is being produced, 680 liters per hour (active chlorine content 850 mg/l, pH 2.4, reduction potential (ORP) 1180 mV), using 24.8 g of sodium chloride per 1 g of active chlorine. The temperature of output solutions will exceed the temperature of water originally used by 26° C. to 30° C.

Example 2

Example 2 gives the results for obtaining disinfectant under minimum flow conditions through the cathode and anode chamber, using exemplary flow rate intervals specified by this disclosure. Fresh water is channelled from an external course through channel 1 (the quantity being 1,204 liters per hour (100%)) through the inlet 21 in the cover 22 of cathode 20 to internal space in the cathode, cooling the cathode and also the electrolyte in cathode chamber. After cooling the cathode, the fresh water will flow through channel 2, outlet 24 in the cover of 23 to the inlet 31 of cover-mixer 30 in the branch of the anode chamber 32. In the area of channel 1 or 2 (not really relevant, depending on the construction of the device), before inlet 31, two flows are separated from the fresh water flow: along channel 71 (channels 72 and 73 are missing in this alternative) 4.8 liters of fresh water per hour (0.4%) to the inlet of the cathode chamber. Along channel 3 fresh water will be flowing at the rate of 200 liters per hour (16.6%) to the mixer of sodium chloride 38 (the mixer shall be operating, using any recognised method). The liquid shall then flow, as an electrolyte, with the concentration of 10 g of sodium chloride per 1 liter, along channel 5 to the inlet 41 of bottom cover 40 of the electrolyser 10. It shall flow along anode 50, flowing as anolyte along the channels 61 in the body, the coupling sleeve 60 from one consecutive anode chamber to another, and will then be directed, as anolyte, having active chlorine concentration of 3 g/l, to the cover-mixer 30 of the branch of anode chamber 32. Anolyte will acquire the required concentration on the cover-mixer 30 and will be then transferred as disinfectant to consumers. The catholyte will then flow through channel 8 of outlet 35 to a utilization facility. Hydrogen will be channelled to an exhaust through outlet 36. Disinfectant is produced at the rate of 1,200 liters per hour (active chlorine content 510 mg/l, pH 7.25, reduction potential (ORP) 890 mV), using 3.33 g of sodium chloride per 1 g of active chlorine. The temperature of output solutions will exceed the temperature of water originally used by 6° C. to 17° C.

Example 3

In example 3 the disinfectant is obtained by allowing the fluids to flow along the same route, which was specified in example 2, but at the maximum flow rates, set out in this disclosure, through the cathode and anode chambers, respectively, at 0.8% (that is, 10 liters per hour) through the cathode chamber and at 20.6% (that is, 280 liters per hour) through the anode chamber. Disinfectant is produced at the rate of 1,360 liters per hour (active chlorine content 505 mg/l, pH 7.27, reduction potential (ORP) 860 mV), using 6.9 g of sodium chloride per 1 g of active chlorine. The temperature of output solutions will exceed the temperature of water originally used by 5° C. to 15° C.

Example 4

Example 4 sets out the results for an alternative configuration, where electrolyte arrives along channel 72 to inlet 42. The channel branches off from channel 5 (channels 71 and 73 are missing in this alternative). The quantity of electrolyte being 12 liters per hour (1%), the remaining fluids are flowing along the routes shown in Example 2. For anode treatment, the quantity of arriving fluid is 240 liters per hour (20%), the concentration of both anode and cathode electrolyte being 11.7 g of sodium chloride per 1 liter. Disinfectant is produced at the rate of 1,200 liters per hour (active chlorine content 500 mg/l, pH 6.2, reduction potential (ORP) 920 mV) by using 4.9 g of sodium chloride per 1 g of active chlorine. The temperature of output solutions will exceed the temperature of water originally used by 7° C. to 18° C.

The working name of the disinfectant, produced under the method, involving the use of fresh water, as cathode chamber electrolyte, as described in this disclosure, is, at the proposal of the authors, ANW—anolyte-neutral-water based; and when using the same solution as the electrolyte of both anode and cathode chamber, ANS—anolyte-neutral-salt based.

Example 5

Example 5 is given for further justification of the concentration range of cathode chamber electrolyte, developed for the purposes of this disclosure. In Example 5, electrolyte at the concentration of 300 g of sodium chloride per 1 liter will be flowing along channel 73 (channels 71 and 72 are missing in this alternative) to the cathode chamber; the remaining fluids are flowing along the routes shown in example 2. Disinfectant is produced at the rate of 1,228 liters per hour at the flow rate of 200 liters per hour through the anode chamber and 10.0 liters per hour through the cathode chamber (active chlorine content 545 mg/l, pH 3.4, reduction potential (ORP) 1160 mV), using 22.4 g of sodium chloride per 1 g of active chlorine, the temperature of output solutions will exceed the temperature of water originally used by 4° C. to 15° C.

The analysis of implementation results of the methods tells us that increasing the flow rate through the cathode and anode chamber of the same electrolyser, also increasing the sodium chloride concentration in electrolyte in cathode chamber will not impose any restrictions to the implementation of the method. The analyses shows that optimum results—for the purposes of effectiveness and availability—will be achieved under the flow rates through the cathode and anode chamber, accordingly to the disclosure, and electrolyte concentration rates, which are entered into cathode and anode chamber.

Useful side effects of the method is the decrease of power consumption for producing 1 g of active chlorine in all the examples, compared to the method employed in Russian patent RU2297980, considering the loss through transformers and rectifiers to be approximately 2.1-2.4-fold.

TABLE 1

| | | | Examples | | | | |
|---|---|---|---|---|---|---|---|
| No | Parameter | Unit | 1 | 2 | 3 | 4 | 5 |
| 1 | Quantity of disinfectant | l/hour | 680 | 1200 | 1357 | 1200 | 1228 |
| 2 | Quantity of catolyte | l/hour | 520 | 4.8 | 10 | 12 | 10 |
| 3 | Water consumption | l/hour | 1200 | 1205 | 1367 | 1212 | 1228 |

TABLE 1-continued

| No | Parameter | Unit | Examples 1 | 2 | 3 | 4 | 5 |
|---|---|---|---|---|---|---|---|
| 4 | Flow through anode chamber | l/hour | 680 | 200 | 280 | 240 | 200 |
| 5 | NaCl in catolyte | g/l | 12.0 | — | — | 11.7 | 300 |
| 6 | NaCl in anode chamber | g/l | 12.0 | 10 | 16.9 | 11.7 | 61.0 |
| 7 | pH of the disinfectant | unit | 2.4 | 7.25 | 7.27 | 6.2 | 3.4 |
|  | Reduction potential (ORP) | mV | 1180 | 890 | 860 | 920 | 1,160 |
|  | Active chlorine content | mg/l | 850 | 510 | 505 | 500 | 545 |
| 8 | Total NaCl consumption | g/hour | 14400 | 2000 | 4720 | 2952 | 15000 |
| 9 | Productivity by active chlorine | g/hour | 580 | 612 | 684 | 600 | 668 |
| 10 | NaCl consumption for active chlorine | g/g | 24.8 | 3.33 | 6.9 | 4.92 | 22.4 |
| 11 | Voltage in electrolyser | V | 20.9 | 10.4 | 11.8 | 10.4 | 10.6 |
| 12 | Current | A | 600 | 640 | 640 | 600 | 600 |
| 13 | Temperature of: Original water | °C. | 22.4 | 21.5 | 23.6 | 21.2 | 25.0 |
|  | Catolyte | °C. | 52.0 | 27.0 | 29.2 | 28.0 | 29.2 |
|  | Disinfectant | °C. | 48.0 | 38.0 | 39.2 | 39.0 | 38.6 |

The invention claimed is:

1. A method for obtaining a disinfectant from an aqueous solution of sodium chloride by using a diaphragm electrolyser having a tubular cathode as an internal electrode, an anode as an external electrode, and a cover-mixer having a branch in communication with an anode chamber of the electrolyser, the method comprising:

providing a first fresh water flow and directing the first fresh water flow to an internal space of the cathode;

separating a second fresh water flow from the first fresh water flow and channeling the second fresh water flow into a cathode chamber of the electrolyser, wherein the flow rate of the second fresh water flow through the cathode chamber is 0.4-0.8% of the flow rate of the first fresh water flow through the internal space of the cathode;

separating a third fresh water flow from the first fresh water flow and channeling said third fresh water flow to a sodium chloride mixer to form a solution having sodium chloride concentration of 0.02-1.2% wt/vol;

channeling said solution to the anode chamber of the electrolyzer as an anolyte flow, wherein the flow rate of the anolyte flow through the anode chamber is 16-20% of the flow rate of the first fresh water flow through the internal space of the cathode;

channeling both the anolyte flow from the anode chamber and the first fresh water flow from the internal space of the cathode to the branch of the cover-mixer in communication with the anode chamber;

reducing a concentration of active chlorine in the anolyte flow by mixing said anolyte flow with the first fresh water supply in the branch of the cover-mixer in communication with the anode chamber to form a disinfectant having with a pH level of 5.5-7.5;

discharging said second fresh water flow from the cathode chamber for utilization;

discharging the disinfectant from the electrolyzer; and channeling hydrogen from the cathode chamber at an exhaust outlet.

2. A method for obtaining a disinfectant from an aqueous solution of sodium chloride by using a diaphragm electrolyser having a tubular cathode as an internal electrode, an anode as an external electrode, and a cover-mixer having a branch in communication with an anode chamber of the electrolyser, the method comprising:

providing a first fresh water flow and directing the first fresh water flow to an internal space of the cathode;

separating a second fresh water flow from the first fresh water flow and channeling said second fresh water flow to a sodium chloride mixer to form a solution having sodium chloride concentration of 0.02-1.2% wt/vol;

separating said solution into an anolyte flow and a catholyte;

channeling said catholyte flow into a cathode chamber of the electrolyser, wherein the flow rate of catholyte flow through the cathode chamber is 0.4-0.8% of the flow rate of the first fresh water flow through the internal space of the cathode;

channeling said anolyte flow to the anode chamber of the electrolyser, wherein the flow rate of the anolyte flow through the anode chamber is 16-20% of the flow rate of the first fresh water flow through the internal space of the cathode;

channeling both the anolyte flow from the anode chamber and the first fresh water flow from the internal space of the cathode to the branch of the cover-mixer in communication with the anode chamber;

reducing a concentration of active chlorine in the anolyte flow by mixing said anolyte flow with the first fresh water supply in the branch of the cover-mixer in communication with the anode chamber to form a disinfectant having with a pH level of 5.5-7.5;

discharging said catholyte flow from the cathode chamber for utilization;

discharging the disinfectant from the electrolyser; and channeling hydrogen from the cathode chamber at an exhaust outlet.

3. A method for obtaining a disinfectant from an aqueous solution of sodium chloride by using a diaphragm electrolyser having a tubular cathode as an internal electrode, an anode as an external electrode, and a cover-mixer having a branch in communication with an anode chamber of the electrolyser, the method comprising:

providing a first fresh water flow and directing the first fresh water flow to an internal space of the cathode;

separating a second fresh water flow from the first fresh water flow and channeling said second fresh water flow to a sodium chloride mixer to form a solution having sodium chloride concentration of 0.02-1.2% wt/vol;

channeling said solution to the anode chamber of the electrolyser as an anolyte flow, wherein the flow rate of the anolyte flow through the anode chamber is 16-20% of the flow rate of the first fresh water flow through the internal space of the cathode;

channeling both the anolyte flow from the anode chamber and the first fresh water flow from the internal space of the cathode to the branch of the cover-mixer in communication with the anode chamber;

reducing a concentration of active chlorine in the anolyte flow by mixing said anolyte flow with the first fresh water supply in the branch of the cover-mixer in communication with the anode chamber to form a disinfectant having with a pH level of 5.5-7.5;

channeling a catholyte flow into a cathode chamber of the electrolyser by an independent channel, wherein said catholyte is a sodium chloride solution and wherein the flow rate of catholyte flow through the cathode chamber is 0.4-0.8% of the flow rate of the first fresh water flow through the internal space of the cathode;

discharging said catholyte flow from the cathode chamber for utilization;

discharging the disinfectant from the electrolyser; and channeling hydrogen from the cathode chamber at an exhaust outlet.

\* \* \* \* \*